US 11,410,454 B2

(12) United States Patent
Bae et al.

(10) Patent No.: US 11,410,454 B2
(45) Date of Patent: Aug. 9, 2022

(54) ELECTRONIC DEVICE FOR RECOGNIZING FINGERPRINT USING DISPLAY

(71) Applicant: Samsung Electronics Co., Ltd., Gyeonggi-do (KR)

(72) Inventors: Jong Kon Bae, Gyeonggi-do (KR); Yo Han Lee, Gyeonggi-do (KR); Yun Pyo Hong, Gyeonggi-do (KR); Dong Hwy Kim, Gyeonggi-do (KR); Han Yu Ool Kim, Gyeonggi-do (KR); Dong Kyoon Han, Gyeonggi-do (KR); Kwang Tai Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/326,497

(22) Filed: May 21, 2021

(65) Prior Publication Data
US 2021/0271849 A1 Sep. 2, 2021

Related U.S. Application Data

(63) Continuation of application No. 16/758,213, filed as application No. PCT/KR2018/013030 on Oct. 30, 2018, now Pat. No. 11,017,201.

(30) Foreign Application Priority Data

Oct. 30, 2017 (KR) .................. 10-2017-0142034

(51) Int. Cl.
G06V 40/13 (2022.01)
G06F 1/16 (2006.01)
G06V 40/12 (2022.01)

(52) U.S. Cl.
CPC ...... *G06V 40/1347* (2022.01); *G06V 40/1318* (2022.01); *G06F 1/1652* (2013.01)

(58) Field of Classification Search
CPC .............. G06K 9/00067; G06K 9/0004; G06F 1/1652; G06V 40/12–1394; G06V 40/1347; G06V 40/1318
See application file for complete search history.

(56) References Cited

U.S. PATENT DOCUMENTS 10,078,777 B2 9/2018 Kim et al.
2001/0052929 A1* 12/2001 Abe ................ H04N 5/232945
348/65
2004/0184027 A1* 9/2004 Mizutani ............ G06K 9/00006
356/71

(Continued)

FOREIGN PATENT DOCUMENTS

KR 2003-0031296 A 4/2003
KR 10-2011-0113501 A 10/2011

(Continued)

*Primary Examiner* — Stephen G Sherman
(74) *Attorney, Agent, or Firm* — Cha & Reiter, LLC

(57) ABSTRACT

According to an embodiment disclosed herein, an electronic device may include a housing, a display panel including a plurality of pixels housed in the housing, a flexible printed circuit board electrically connected to the display panel, a fingerprint sensor disposed under at least a portion of the display panel and on the flexible printed circuit board, a display driver integrated circuit (IC) and a processor electrically connected to the fingerprint sensor and the display driver IC.

11 Claims, 8 Drawing Sheets

(56) References Cited

U.S. PATENT DOCUMENTS

| | | | |
|---|---|---|---|
| 2009/0039241 A1* | 2/2009 | Ueki | A61B 5/0059 250/227.14 |
| 2015/0242696 A1* | 8/2015 | Kim | G06K 9/00013 345/173 |
| 2015/0294627 A1 | 10/2015 | Yoo et al. | |
| 2016/0012802 A1 | 1/2016 | Woo et al. | |
| 2017/0220838 A1 | 8/2017 | He et al. | |
| 2017/0270342 A1 | 9/2017 | He et al. | |
| 2017/0300736 A1 | 10/2017 | Song et al. | |
| 2018/0012069 A1* | 1/2018 | Chung | G06K 9/2036 |
| 2020/0074142 A1* | 3/2020 | Yang | G06F 3/017 |

FOREIGN PATENT DOCUMENTS

| | | |
|---|---|---|
| KR | 10-2015-0118721 A | 10/2015 |
| KR | 10-1683759 B1 | 12/2016 |
| KR | 10-2017-0030735 A | 3/2017 |
| KR | 10-2017-0119623 A | 10/2017 |

* cited by examiner

ELECTRONIC DEVICE FOR RECOGNIZING FINGERPRINT USING DISPLAY

This application is a Continuation of U.S. patent application Ser. No. 16/758,213 filed on Apr. 22, 2020, which is a National Phase Entry of PCT International Application No. PCT/KR2018/013030, filed on Oct. 30, 2018, and claims a priority to Korean Patent Application No. 10-2017-0142034 which was filed on Oct. 30, 2017, the contents of which are incorporated herein by reference.

TECHNICAL FIELD

Embodiments disclosed herein relate to a technology for providing a user interface in fingerprint recognition using a display.

BACKGROUND ART

With the development of fingerprint recognition technology, an electronic device (e.g., smartphone) equipped with a fingerprint sensor is widely used. Such an electronic device may release a screen lock or execute various functions such as a financial transaction using fingerprint information obtained through a fingerprint sensor.

The electronic device may brighten the brightness of a display to obtain the fingerprint information. The light emitted from the display may be input to the fingerprint sensor after being reflected from a user's finger. The fingerprint sensor may obtain the fingerprint information of the finger based on the input light.

DISCLOSURE

Technical Problem

The electronic device may output a mask image when obtaining the fingerprint information. The mask image may refer to an image having a somewhat dark color to prevent glare of the user when the display emits light brightly.

However, the timing at which the mask image is output and the timing at which the display emits light may be different. For example, when the mask image is output later than the timing at which the display emits light, the user may be blinded by the light emitted from the display. On the contrary, when the mask image is output earlier than the timing at which the display emits light, the screen may be dark due to the mask image, and thus the user may be uncomfortable.

Embodiments disclosed in the disclosure provide an electronic device for solving the above-described problems and problems raised in the disclosure.

Technical Solution

According to an embodiment disclosed herein, an electronic device may include a housing, a display panel including a plurality of pixels housed in the housing, a flexible printed circuit board electrically connected to the display panel, a fingerprint sensor disposed under at least a portion of the display panel and on the flexible printed circuit board, a display driver integrated circuit (IC), and a processor electrically connected to the fingerprint sensor and the display driver IC, wherein the processor may allow the display driver IC to output a mask image having a specified brightness through the display panel at a first timing when a contact by an external object is detected using the at least a portion, and allow at least one of the plurality of pixels to emit light using the display driver IC at a second timing corresponding to the first timing.

According to an embodiment disclosed herein, an electronic device may include a processor, a display panel, an image sensor disposed in a specified area of the display panel or under the display panel, and a display driver integrated circuit (IC) that drives the display panel, the display driver IC including a memory that stores an icon image output to an area corresponding to the specified area, wherein the display drive IC may identify reception of a signal related to a change in a brightness of the display panel from the processor, display a background image having a specified brightness and the icon image based at least on the signal, and emit light using at least partially an area corresponding to the icon image to obtain information corresponding to a fingerprint of an external object using the image sensor.

According to an embodiment disclosed herein, an electronic device may include a processor, a display panel, an image sensor disposed in a specified area of the display panel or under the display panel, a display driver integrated circuit (IC) that drives the display panel, and a memory that stores a mask image having a specified brightness, wherein the display driver IC may identify reception of a signal related to a change in a brightness of the display panel from the processor and output the mask image through the display panel based on the signal and a transparency of a first area of the mask image corresponding to the specified area and a transparency of a second area of the mask image except for the first area may be different from each other.

According to an embodiment disclosed herein, an electronic device may include a processor, a display panel operable in a first operation mode of a specified brightness or a second operation mode different from the first operation mode, and a display driver IC that drives the display panel, wherein the display driver IC may identify reception of a signal related to switching from the first operation mode to the second operation mode, obtain an image including a transparency in a specified range when the signal is received, synchronize a time point at which the obtained image is displayed on the display panel and a time point at which switching to the second operation mode is performed with a specified time point, and display the image using the display panel which is driven in the second operation mode after a time point which the synchronization is made.

Advantageous Effects

According to the embodiments disclosed in the present disclosure, it is possible to prevent the glare of the user. In addition, according to the embodiments disclosed in the present disclosure, user convenience may be improved.

In addition, various effects may be provided that are directly or indirectly understood through the disclosure.

MODE FOR INVENTION

Figure 1:
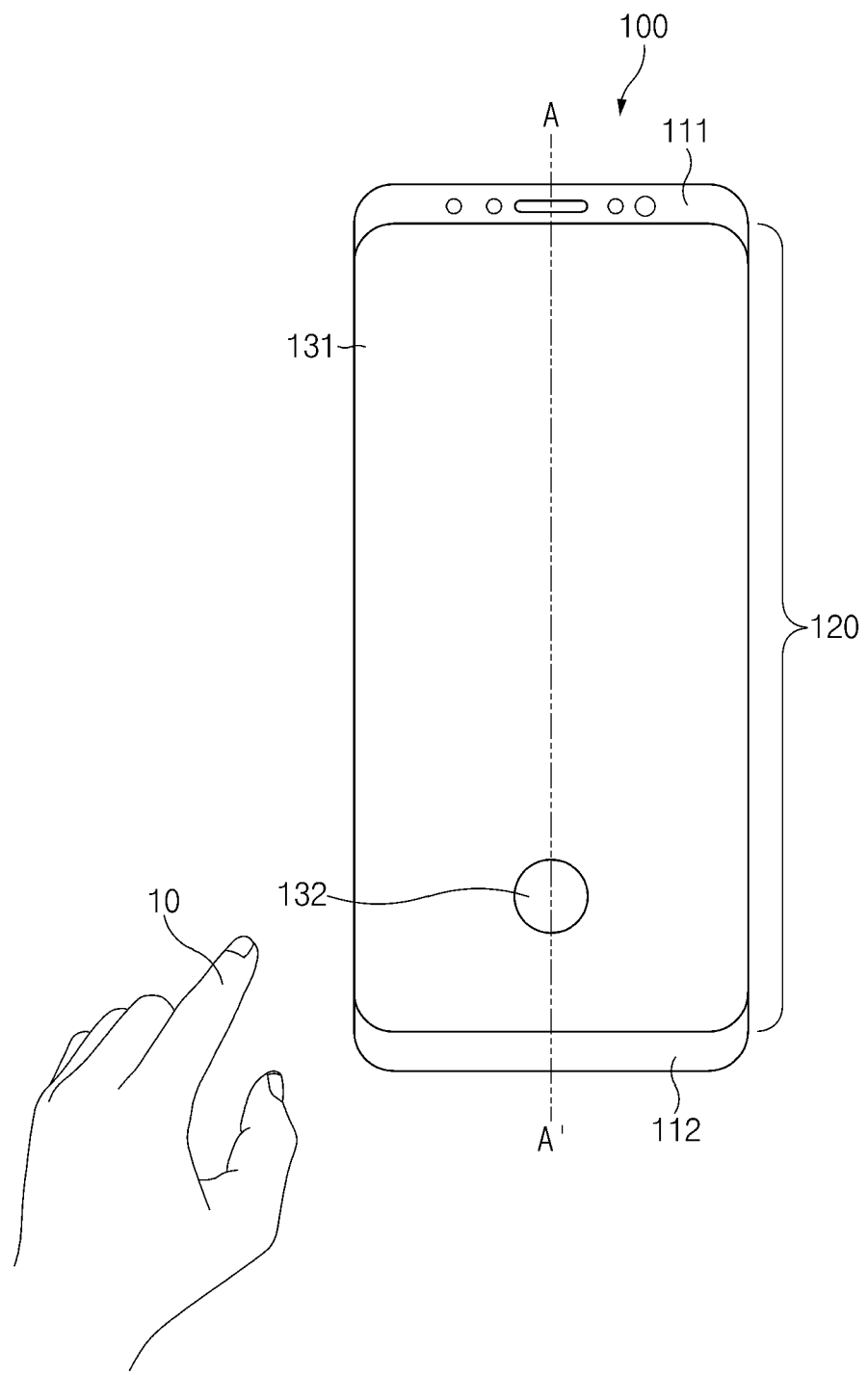
FIG. 1 illustrates a front surface of an electronic device according to an embodiment of the disclosure.

FIG. 1 illustrates a front surface of an electronic device according to an embodiment of the disclosure.

Figure 2:
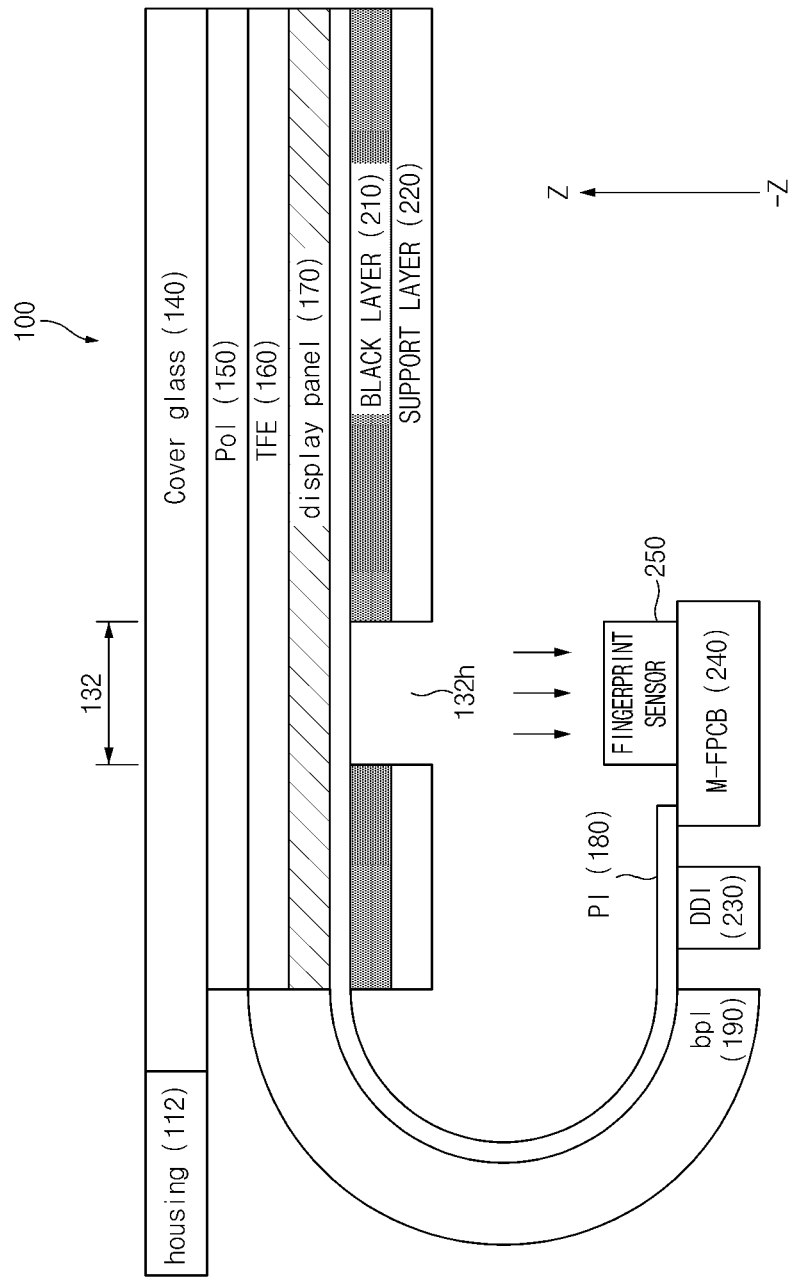
FIG. 2 is a cross-sectional view of an electronic device according to an embodiment.

Referring to FIG. 1, an electronic device 100 may include housings 111 and 112, a display 120, and a fingerprint sensor (e.g., 250 of FIG. 2).

The housings 111 and 112 may protect various parts included in the electronic device 100 from external shock. For example, the display 120, the fingerprint sensor and the like may be mounted in the housings 111 and 112, and the housings 111 and 112 may protect the display 120, the fingerprint sensor and the like from external shock. According to an embodiment, the housings 111 and 112 may form an appearance of the electronic device 100.

The display 120 may output content (e.g., text, images, video, icons, widgets, or symbols) or receive a touch input (e.g., touch, gesture, hovering, or the like) from a user.

The fingerprint sensor may acquire fingerprint information of a finger 10. For example, when the finger 10 contacts a fingerprint detection area 132 (or at least a portion of the display 120), the fingerprint sensor may acquire fingerprint information based on light reflected from the finger 10.

According to an embodiment, when the finger 10 contacts the fingerprint detection area 132, the electronic device 100 may output a mask image 131 (or display image) through the display 120. Herein, the mask image 131 may refer to an image in which an area except for the fingerprint detection area 132 has a specified brightness (or dark brightness).

According to an embodiment, the electronic device 100 may brighten the brightness of the display 120 at a timing at which the mask image 131 is output. In other words, the timing at which the mask image 131 is output and a timing at which the brightness of the display 120 is brightened may coincide with each other substantially. Therefore, light may be output through the fingerprint detection area 132, and light may be hardly output through an area except for the fingerprint detection area 132. Light output through the fingerprint detection area 132 may be reflected by the finger 10 and then input to the fingerprint sensor.

According to an embodiment of the disclosure, it is possible to prevent flickering or glaring of the display (e.g., prevent a user from recognizing flickering of the display) and improve user convenience by making the timing of outputting the mask image 131 and the timing of brightening the brightness of the display 120 coincident with each other.

FIG. 2 is a cross-sectional view of an electronic device according to an embodiment. FIG. 2 is a cross-sectional view taken along line A-A' of the electronic device 100 shown in FIG. 1.

Referring to FIG. 2, the electronic device 100 may include the housing 112, a cover glass 140, a polarizer 150, and a thin film encapsulation (TFE) 160, a display panel 170, a polyimide (PI) film 180, a bending protect layer (BPL) 190, a black layer 210, a support layer 220, a display driver IC (DDI) 230, a printed circuit board 240 (e.g., a module-flexible printed circuit board (M-FPCB)), and a fingerprint sensor 250. The components illustrated in FIG. 2 are exemplary, and the electronic device 100 may not include some of the components illustrated in FIG. 2 or may further include components not illustrated in FIG. 2.

The cover glass 140 may transmit light generated by a display. In addition, a user may touch an upper surface of the cover glass 140 using a part of a body (e.g., the finger 10) to perform a touch (including a touch using an electronic pen). The cover glass 140 may be formed of, for example, tempered glass, tempered plastic, flexible polymer material, or the like. According to an embodiment, the cover glass 140 may also be referred to as a glass window. Although the housings 111 and 112 and the cover glass 140 are shown as separate components herein, the cover glass 140 may be a part of the housings 111 and 112.

The polarizer 150 (or the polarizing film) may transmit only light vibrating in one direction among light incident on the cover glass 140. For example, the polarizer 150 may transmit only light vibrating vertically and block light vibrating horizontally.

The thin film encapsulation 160 may be disposed in the −z direction of the polarizer 150. The thin film encapsulation 160 may protect pixels disposed on the display panel 170.

A plurality of wires and a plurality of pixels may be disposed in the display panel 170. For example, a plurality of gate lines and a plurality of data lines may be disposed in the display panel 170, and the gate lines and the data lines may cross each other. The pixels may emit light based on signals supplied from the gate lines and the data lines.

The PI film 180 may be disposed in the −z direction of the display panel 170. The PI film 180 may include a wire for supplying power and/or a signal to the display panel 170. According to an embodiment, the PI film 180 may be formed of a bendable material and may extend from the display panel 170 to the printed circuit board 240.

The BPL 190 may be disposed in a bent portion of the PI film 180, thereby preventing the PI film 180 from being damaged.

The black layer 210 (e.g., an embo layer including an uneven pattern) may be disposed in the −z direction of the display panel 170. The black layer 210 may block light generated by the display panel 170 or light incident from the outside.

The support layer 220 may be disposed in the −z direction of the black layer 210. The support layer 220 may be a buffer layer (e.g., a sponge layer). The support layer 220 may protect other components inside the electronic device 100 by absorbing an external shock.

A heat dissipation member (not shown) may be disposed in the −z direction of the support layer 220. The heat dissipation member may be made of copper (Cu) or graphite to block electro-magnetic interference between the display panel 170 and other parts.

The display driver IC (DDI) 230 may be disposed in a portion of the PI film 180. The display driver IC 230 may control the display panel 170 through the PI film 180. For example, the display driver IC 230 may enable at least a portion of the display panel 170 to emit light.

The printed circuit board 240 may be electrically connected to a portion of the PI film 180. For example, the printed circuit board 240 may be electrically connected to a conductive pattern (or wiring) formed on the PI film 180.

The fingerprint sensor 250 may be disposed on the printed circuit board 240. The fingerprint sensor 250 may obtain fingerprint information through a hole 132*h* formed in the black layer 210 and the support layer 220. For example, when the finger 10 contacts the fingerprint detection area 132 (at least a portion of the display panel 170 when the display panel 170 includes the cover glass 140), the electronic device 100 may brighten the brightness of pixels disposed on the display panel 170. Light emitted from the pixels may be reflected by the finger 10 and incident onto the fingerprint sensor 250 through the hole 132h. The fingerprint sensor 250 may obtain fingerprint information of the finger 10 based on the incident light.

According to an embodiment, the electronic device 100 may output the mask image 131 through the display panel 170 when brightening the brightness of the pixels. That is, the timing at which the mask image 131 is output and the timing at which the brightness of the pixels becomes bright may coincide with each other substantially. Therefore, when viewed from above the cover glass 140, an area except for the fingerprint detection area 132 may appear dark.

According to an embodiment of the disclosure, it is possible to prevent flickering of the display or glaring of a user (e.g., prevent a user from recognize flickering of the display) in fingerprint recognition by making the timing at which the mask image 131 is output and the timing at which the brightness of the pixels is brightened coincident with each other substantially.

According to an embodiment, the display panel 170 may include the cover glass 140, the polarizer 150, the thin film encapsulation (TFE), and the polyimide (PI) film 180, the bending protect layer (BPL) 190, the black layer 210, and the support layer 220. In this case, when the finger 10 touches at least a portion of the display panel 170, the electronic device 100 may brighten the brightness of the pixels. Light emitted from the pixels may be reflected by the finger 10 and incident onto the fingerprint sensor 250 through the hole 132h. The fingerprint sensor 250 may obtain fingerprint information of the finger 10 based on the incident light. The display panel 170 shown in FIG. 2 is exemplary, and the display panel 170 may further include other components not shown in FIG. 2.

Figure 3:
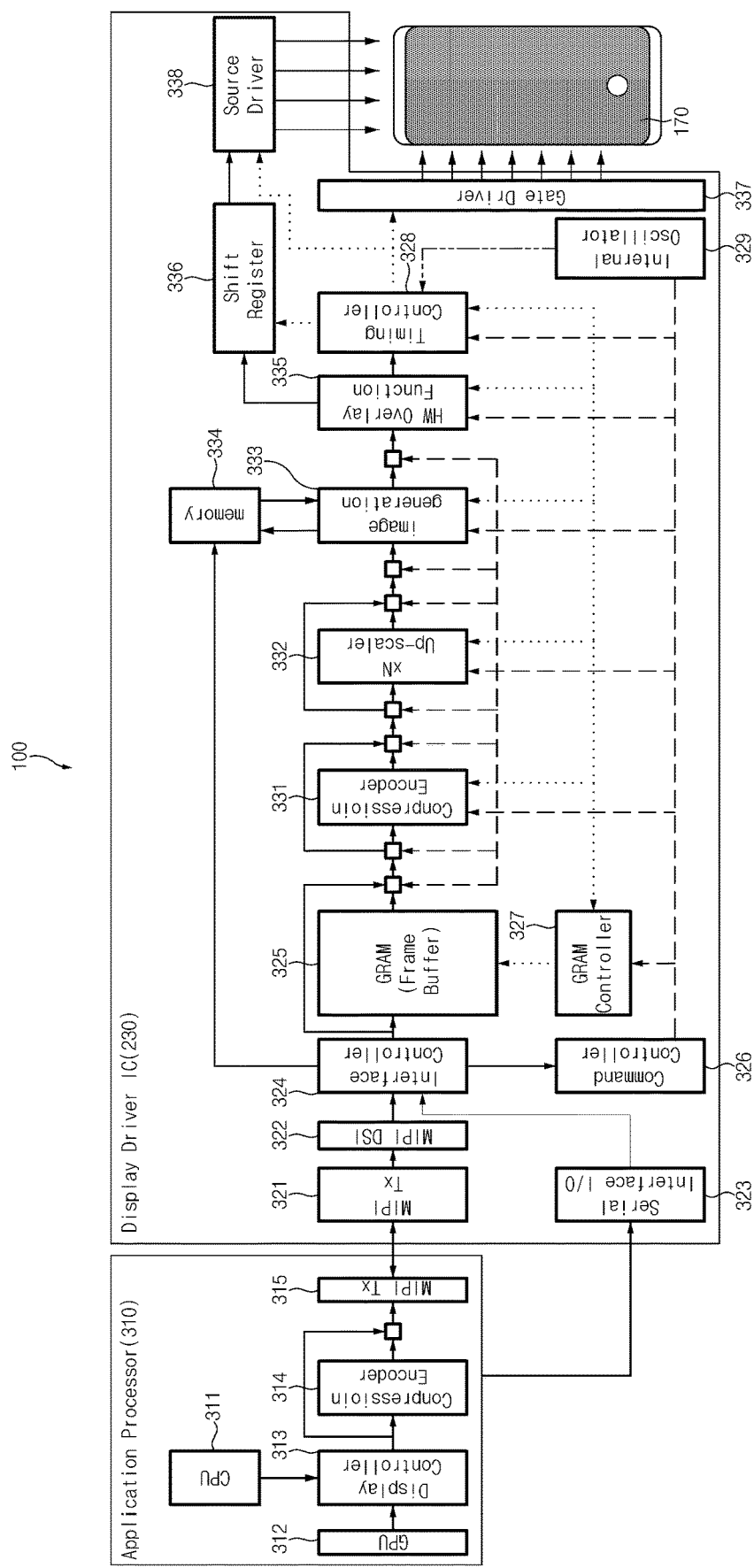
FIG. 3 is a block diagram of an electronic device according to an embodiment.

FIG. 3 illustrates a block diagram of an electronic device according to an embodiment of the disclosure. FIG. 3 illustrates a block diagram of components included in the electronic device 100.

Referring to FIG. 3, the electronic device 100 may include an application processor 310 (AP), a display driver integrated circuit (DDI), and the display panel 170.

The application processor 310 may include a central processing unit (CPU) 311, a graphic processing unit (GPU) 312, a display controller 313, a compression encoder 314, and a mobile industry processor interface (MIPI) transmitting module 315.

The central processing unit 311 may generate control information (or instructions). The control information may allow the electronic device 100 to enter a specified mode or select first image data to be output to the display panel 170. Herein, the specified mode may be referred to as a high brightness mode (HBM) in which pixels emit light brightly instantaneously, an always on display mode (AOD), a screen lock mode, or the like.

The graphic processing unit 312 may generate the first image data. The first image data may refer to various guides, icons, and the like, output through the display panel 170. The guide is a visual indicator (VI) surrounding the fingerprint detection area 132, and the user may recognize the timing at which the finger 10 is to make a touch and a position of the fingerprint sensor through the guide. The icon may be, for example, an image of a fingerprint shape, and the user may recognize a position at which the finger 10 is to make a touch through the icon.

The display controller 313 may transmit control information received from the central processing unit 311 and/or the first image data received from the graphic processing unit 312 to the compression encoder 314. The compression encoder 314 may encode the control information and the first image data in a specified manner. According to an embodiment, the process of encoding the control information and the first image data may be omitted or bypassed. The MIPI transmitting module 315 may transmit the control information and/or the first image data to the display driver IC 230.

The display driver IC 230 may include an MIPI receiving module 321, an MIPI display serial interface 322, a serial interface receiving module 323, an interface controller 324, a graphics RAM 325, a command controller 326, a graphics RAM controller (GRAM controller) 327, a timing controller 328, an internal oscillator 329, a compression encoder 331, an up-scaler 332, an image generation module 333, a memory 334, a hardware overlay module 335, a shift register 336, a gate driver 337, and a source driver 338.

The MIPI receiving module 321 may receive the control information and/or the first image data from the MIPI transmitting module 315.

The MIPI display serial interface 322 may set an address at which the first image data received by the MIPI receiving module 321 is to be stored in the graphic RAM 325. The MIPI display serial interface 322 may transmit control information to the interface controller 324.

According to an embodiment, the central processing unit 311 may transmit the control information to the serial interface receiving module 323, not to the display controller 313. The serial interface receiving module 323 may transmit the control information received by the central processing unit 311 to the interface controller 324.

The interface controller 324 may allow the graphic RAM 325 to store the first image data. According to an embodiment, the interface controller 324 may control the graphics RAM 325 such that the first image data is stored at an address set by the MIPI display serial interface 322. In addition, the interface controller 324 may transmit the control information to the command controller 326.

The graphics RAM 325 may store the first image data. In this case, the graphic RAM 325 may store the first image data at an address set by the MIPI display serial interface 322.

The command controller 326 may control the graphic RAM controller 327, the timing controller 328, and the internal oscillator 329 based on the control information. For example, the command controller 326 may allow the graphic RAM controller 327 to select at least a part of the first image data stored in the graphic RAM 325.

According to an embodiment, the command controller 326 may enable the timing controller 328 to control driving timings of the gate driver 337 and the source driver 338. For example, when the control information includes a command for directing the electronic device 100 to enter the HBM, the command controller 326 may allow the pixels disposed on the display panel 170 to emit light brightly instantaneously. A signal for controlling the timing controller 328 may be transmitted directly to the timing controller 328 or may be transmitted to the timing controller 328 through the internal oscillator 329.

The graphic RAM controller 327 may select at least a part of the first image data stored in the graphics RAM 325. For example, the graphic RAM controller 327 may select at least a part of the first image data based on the address of the first image data and/or the size of the first image data.

The compression encoder 331 may encode the selected first image data. The size of the first image data selected may be reduced through the encoding process.

The up-scaler 332 may enlarge the first image data at a specified magnification.

The image generation module 333 may transmit the first image data to the hardware overlay module 335 or generate second image data and transmit the second image data to the hardware overlay module 335. In the disclosure, the second image data may refer to the mask image 131 described with reference to FIG. 1.

According to an embodiment, the second image data may be generated by the graphic processing unit 312. In this case, the second image data may be stored in the graphic RAM 325 or the memory 334. The image generation module 333 may transmit the second image data stored in the graphic RAM 325 or the memory 334 to the hardware overlay module 335.

The hardware overlay module 335 may blend at least a part of the first image data and/or at least a part of the second image data and transmit a result of the blending to the timing controller. For example, the hardware overlay module 335 may blend a guide, an icon, the mask image 131, and the like to transmit a result of the blending to the timing controller. The blended screen may be output through the display panel 170.

The shift register 336 may change a position at which the first image data and/or the second image data are to be output on the display.

The gate driver 337 and the source driver 338 may transmit a gate signal and a data signal to the pixels such that the pixels emit light.

The display panel 170 may output the first image data and/or the second image data through the pixels.

According to an electronic device according to a comparative example, the mask image 131 (or the second image data) and the control information may be generated by the graphic processing unit 312 and the central processing unit 311, respectively. Since the mask image 131 has a larger magnitude and longer processing speed than the control information, the times during which the mask image 131 and the control information are transmitted to the display panel 170 may be different from each other.

However, according to an embodiment of the disclosure, the image generation module 333 may directly generate the mask image 131 or select the mask image 131 stored in the graphic RAM 325 or the memory 334 and output the mask image 131 to the display panel 170. Accordingly, the timing at which the control information is transmitted to the display panel 170 and the timing at which the mask image 131 is output to the display panel 170 may coincide with each other substantially. That is, the timing at which the mask image 131 is output to the display panel 170 and the timing at which the pixels emit light brightly (or the timing at which the electronic device 100 enters the HBM) may be coincide with each other substantially, thereby preventing the glare of the user.

In the disclosure, components described with the same reference numerals as those of the electronic device 100 illustrated in FIGS. 1, 2, and 3 may be identically applied to those described with reference to FIGS. 1, 2, and 3.

Figure 4:
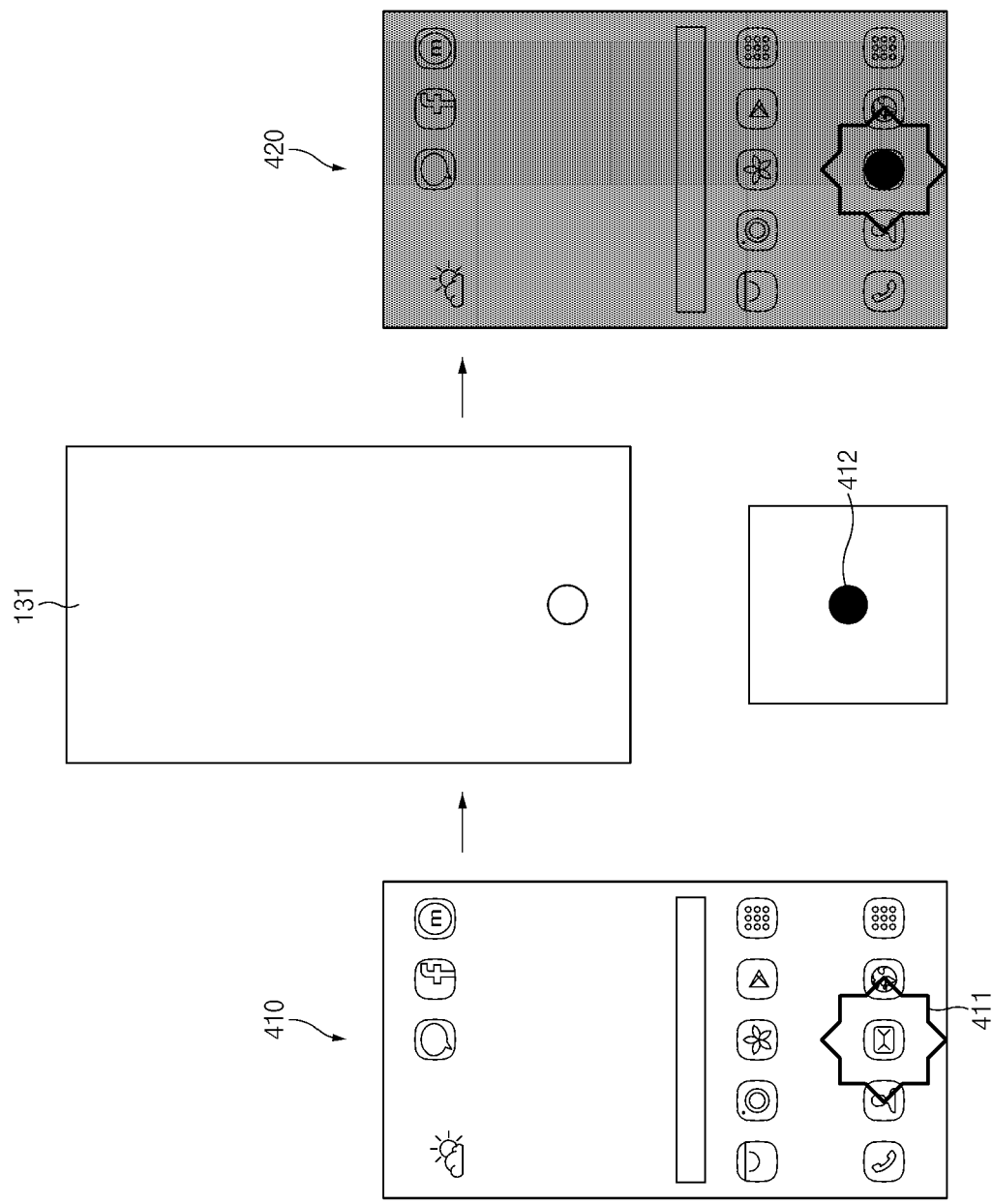
FIG. 4 illustrates a user interface output through an electronic device according to an embodiment of the disclosure.

FIG. 4 illustrates a user interface output through an electronic device according to an embodiment of the disclosure.

Referring to FIG. 4, when it is required to obtain fingerprint information of the user, the electronic device 100 (or the application processor 310) may output a guide 411 through a first screen 410 (e.g., the home screen). For example, when the user executes a bank application for cash transfer, the fingerprint information of the user is required, and the electronic device 100 may output the guide 411 for displaying a position of the fingerprint sensor. The guide 411 may at least partially surround the fingerprint detection area 132 (e.g., the area where the guide 411 is displayed at least partially overlaps the fingerprint detection area 132), and the user may recognize the position at which the finger 10 is to be touched through the guide 411.

When the user touches at least a portion of the guide 411 with the finger 10, the electronic device 100 (or the display driver IC 230) may generate the mask image 131 and/or an icon 412. The generated mask image 131 and/or the icon 412 may be output through a second screen 420. The second screen 420 may refer to, for example, a screen on which the mask image 131 and/or the icon 412 are output in which pixels emit light brightly simultaneously (or the electronic device 100 enters a high brightness mode (HBM)). The icon 412 may refer to an image output at a position corresponding to the fingerprint sensor, and may be changed according to a user's selection, such as a fingerprint shape, a circle shape, or a star shape.

In another embodiment, when the user touches an area inside the guide 411 with the finger 10, the electronic device 100 (or the image generation module 333) may select the mask image 131 and/or the icon 412 stored in the graphic RAM 325 or the memory 334. The selected mask image 131 and/or the icon 412 may be output through the second screen 420.

In another embodiment, the electronic device 100 may output the generated or selected mask image 131 through the second screen 420. In this case, the pixels may emit light brightly, but the icon 412 may not be output.

Although not shown in FIG. 4, when it is required to obtain fingerprint information in a screen lock state or an always on display (AOD), the electronic device 100 may switch the screen from a lock screen to the first screen 410. In the state of being switched to the first screen 410, the electronic device 100 may output the guide 411 and obtain fingerprint information.

According to an embodiment, the electronic device 100 may adjust a brightness of an area corresponding to the fingerprint sensor 250 and a brightness of a remaining area in the mask image 131. For example, the electronic device 100 may adjust (or darken) the brightness of an area of the mask image 131 corresponding to the fingerprint sensor 250 based on a burn-in degree of the pixels.

Figure 5:
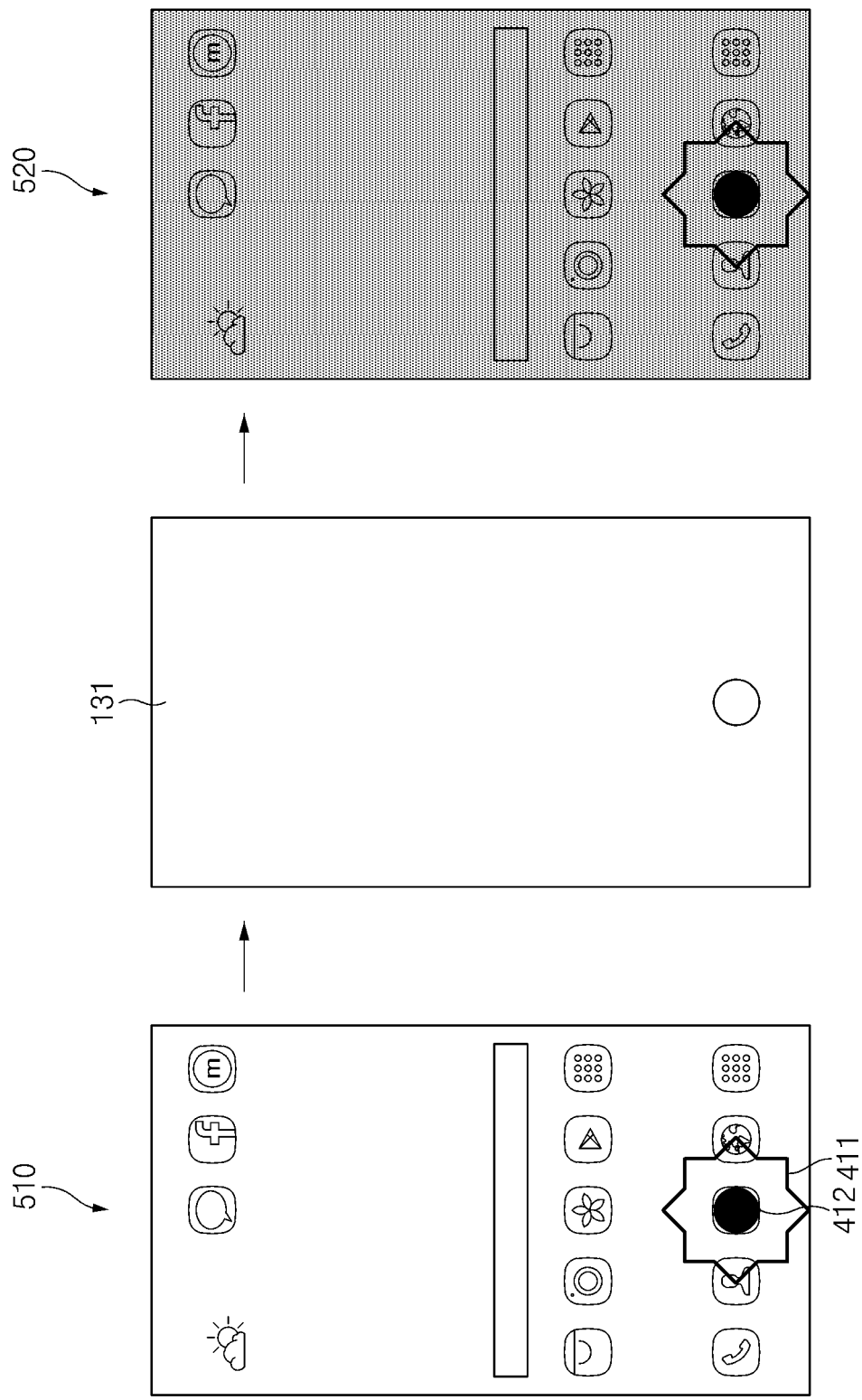
FIG. 5 illustrates a user interface output through an electronic device according to another embodiment.

FIG. 5 illustrates a user interface output through an electronic device according to another embodiment.

Referring to FIG. 5, when it is required to obtain fingerprint information of a user, the electronic device 100 (or the application processor 310) may output the guide 411 and the icon 412 through a first screen 510 (e.g., a home screen). For example, when the user executes a bank application for cash transfer, the electronic device 100 may output the guide 411 and the icon 412 because the fingerprint information of the user is required. The guide 411 may surround the fingerprint detection area 132, and the icon 412 may be output at a position corresponding to the fingerprint sensor.

When the user touch the icon 412 with the finger 10, the electronic device 100 (or the display driver IC 230) may generate the mask image 131. The generated mask image 131 may be output through a second screen 520. The second screen 520 may refer to, for example, a screen on which the mask image 131 is output simultaneously when pixels emit light brightly (simultaneously when the electronic device 100 enters a high brightness mode (HBM)).

In another embodiment, when the user touches the icon 412 with the finger 10, the electronic device 100 (or the image generation module 333) may select the mask image 131 stored in the graphic RAM 325 or the memory 334. The selected mask image 131 may be output through the second screen 520.

Although not shown in FIG. 5, when it is required to obtain fingerprint information in a screen lock state or an always on display (AOD), the electronic device 100 may switch the screen from a lock screen to the first screen 510. In the state of being switched to the first screen 510, the electronic device 100 may output the guide 411 and the icon 412 and obtain fingerprint information.

Figure 6:
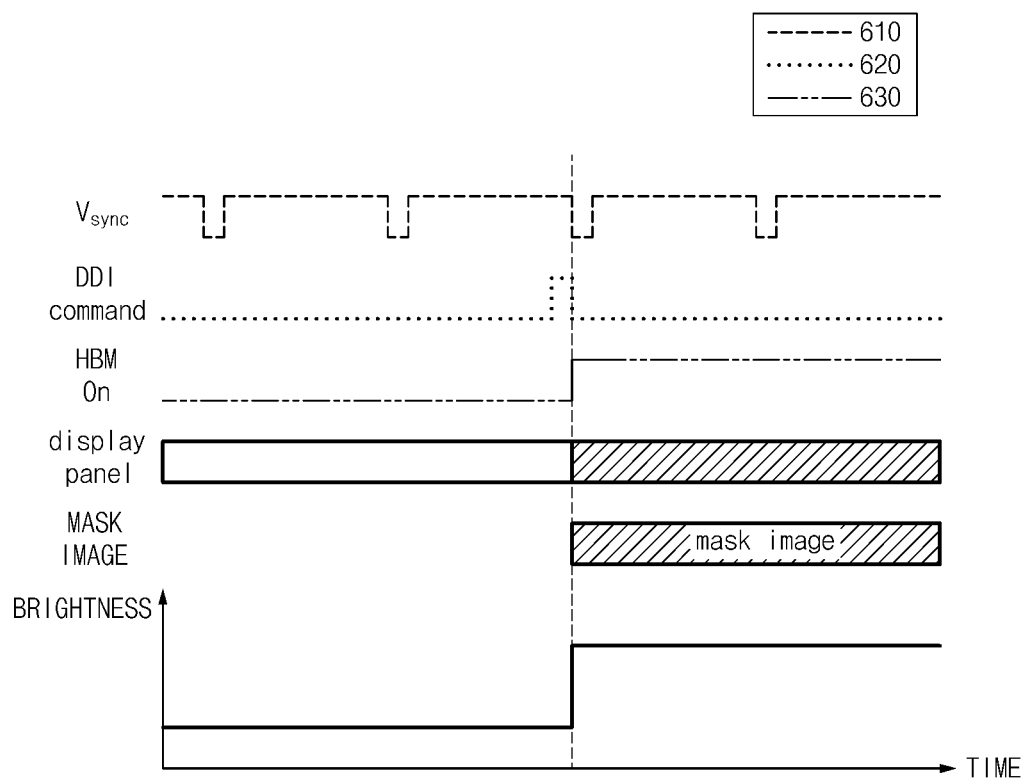
FIG. 6 is a timing diagram of components included in the electronic device according to an embodiment.

FIG. 6 is a timing diagram of components included in the electronic device 100 according to an embodiment.

Referring to FIG. 6, graph 610 represents a synchronization signal, graph 620 represents a control signal for directing the electronic device 100 to enter a high brightness mode (HBM), and graph 630 represents whether or not the electronic device 100 has entered the HBM. The synchronization signal may indicate a timing at which a signal (e.g., a data signal) is transmitted from the display driver IC 230 to the display panel 170. The high state in graph 620 may indicate that the display driver IC 230 has transmitted a control signal to the display panel 170. The high state in graph 630 may indicate that the electronic device 100 has entered the HBM.

Referring to graphs 610, 620, and 630, the display driver IC 230 may transmit a control signal to the display panel 170 in synchronization with the synchronization signal. The electronic device 100 may enter the HBM and pixels disposed on the display panel 170 may emit light brightly instantaneously because the control signal is transmitted to the display panel 170.

Meanwhile, when the display driver IC 230 transmits the control signal, the electronic device 100 (or the display driver IC 230) may output the mask image 131 through the display panel 170. In other words, a timing at which the mask image 131 is output through the display panel 170 and a timing at which the pixels emit light brightly may coincide with each other substantially. Thus, when viewed from above the display panel 170, the display panel 170 may be dark except for the fingerprint detection area 132.

According to the embodiment of the disclosure, it is possible to prevent flickering or glaring of the display (e.g., prevent a user from recognizing flickering of the display) and improve user convenience by making the timing at which the mask image 131 is output through the display panel 170 and the timing at which the pixels emit light brightly instantaneously coincident with each other substantially.

According to an embodiment of the disclosure, an electronic device may include a housing, a display panel including a plurality of pixels housed in the housing, a flexible printed circuit board electrically connected to the display panel, a fingerprint sensor disposed under at least a portion of the display panel and on the flexible printed circuit board, a display driver integrated circuit (IC), and a processor electrically connected to the fingerprint sensor and the display driver IC, wherein the processor may allow the display driver IC to output a mask image having a specified brightness through the display panel at a first timing when a contact by an external object is detected using the at least a portion, and allow at least one of the plurality of pixels to emit light using the display driver IC at a second timing corresponding to the first timing.

According to an embodiment of the disclosure, the processor may allow the display driver IC to generate the mask image and outputs the mask image through the display panel at the first timing.

According to an embodiment of the disclosure, the processor may generate the mask image, and the display driver IC may include a memory configured to store the generated mask image and a controller configured to select the mask image stored in the memory and output the mask image through the display panel.

According to an embodiment of the disclosure, the memory may include a graphic RAM (GRAM).

According to an embodiment of the disclosure, the processor may allow the display driver IC to form a hole in an area corresponding to the at least a portion of the mask image.

According to an embodiment of the disclosure, the processor may allow the display driver IC to output an icon having a specified shape in an area corresponding to the at least a portion.

According to an embodiment of the disclosure, the processor may allow the display driver IC to output icon at the first timing.

According to an embodiment of the disclosure, the processor may output a guide surrounding the at least a portion through the display panel when a condition for obtaining fingerprint information is satisfied through the fingerprint sensor.

According to an embodiment of the disclosure, the processor may output an icon having a specified shape in an area corresponding to the at least a portion.

According to an embodiment, the first timing coincides with the second timing.

According to an embodiment of the disclosure, an electronic device may include a processor, a display panel, an image sensor disposed in a specified area of the display panel or under the display panel, and a display driver integrated circuit (IC) that drives the display panel, the display driver IC including a memory that stores an icon image output to an area corresponding to the specified area, wherein the display driver IC may identify reception of a signal related to a change in a brightness of the display panel from the processor, display a background image having a specified brightness and the icon image based at least on the signal, and emit light using at least partially an area corresponding to the icon image to obtain information corresponding to a fingerprint of an external object using the image sensor.

According to an embodiment of the disclosure, the display driver IC may allow a first group of pixels disposed in an area corresponding to the specified area to emit light at a first brightness, and allow a second group of pixels except for the first group of pixels among pixels disposed on the display panel to emit light at a second brightness.

According to an embodiment of the disclosure, a timing at which the background image and the icon image are displayed and a timing at which the light is emitted may coincide with each other.

According to an embodiment of the disclosure, the display driver IC may receive the background image from the processor and stores the background image.

According to an embodiment of the disclosure, the display driver IC may receive the signal and the background image from the processor within a specified period of time or for different periods of time.

According to an embodiment of the disclosure, an electronic device may include a processor, a display panel, an image sensor disposed in a specified area of the display panel or under the display panel, a display driver integrated circuit (IC) that drives the display panel, and a memory that stores a mask image having a specified brightness, wherein the display driver IC may identify reception of a signal related to a change in a brightness of the display panel from the processor and output the mask image through the display panel based on the signal and a transparency of a first area of the mask image corresponding to the specified area and a transparency of a second area of the mask image except for the first area may be different from each other.

According to an embodiment of the disclosure, the display driver IC may change the brightness of the display panel based on the signal and output the mask image through the display panel at a timing coinciding with a timing at which the brightness is changed.

According to an embodiment of the disclosure, the display driver IC may receive a background image at a timing coinciding with a timing at which the signal is received from the processor or receive the background image at a timing different from the timing at which the signal is received.

According to an embodiment of the disclosure, an electronic device may include a processor, a display panel operable in a first operation mode of a specified brightness or a second operation mode different from the first operation mode, and a display driver IC that drives the display panel, wherein the display driver IC may identify reception of a signal related to switching from the first operation mode to the second operation mode, obtain an image including a transparency in a specified range when the signal is received, synchronize a time point at which the obtained image is displayed on the display panel and a time point at which switching to the second operation mode is performed with a specified time point, and display the image using the display panel which is driven in the second operation mode after a time point which the synchronization is made.

According to an embodiment, the image having the transparency in the specified range may be stored in a specified memory area in the display driver IC.

Figure 7:
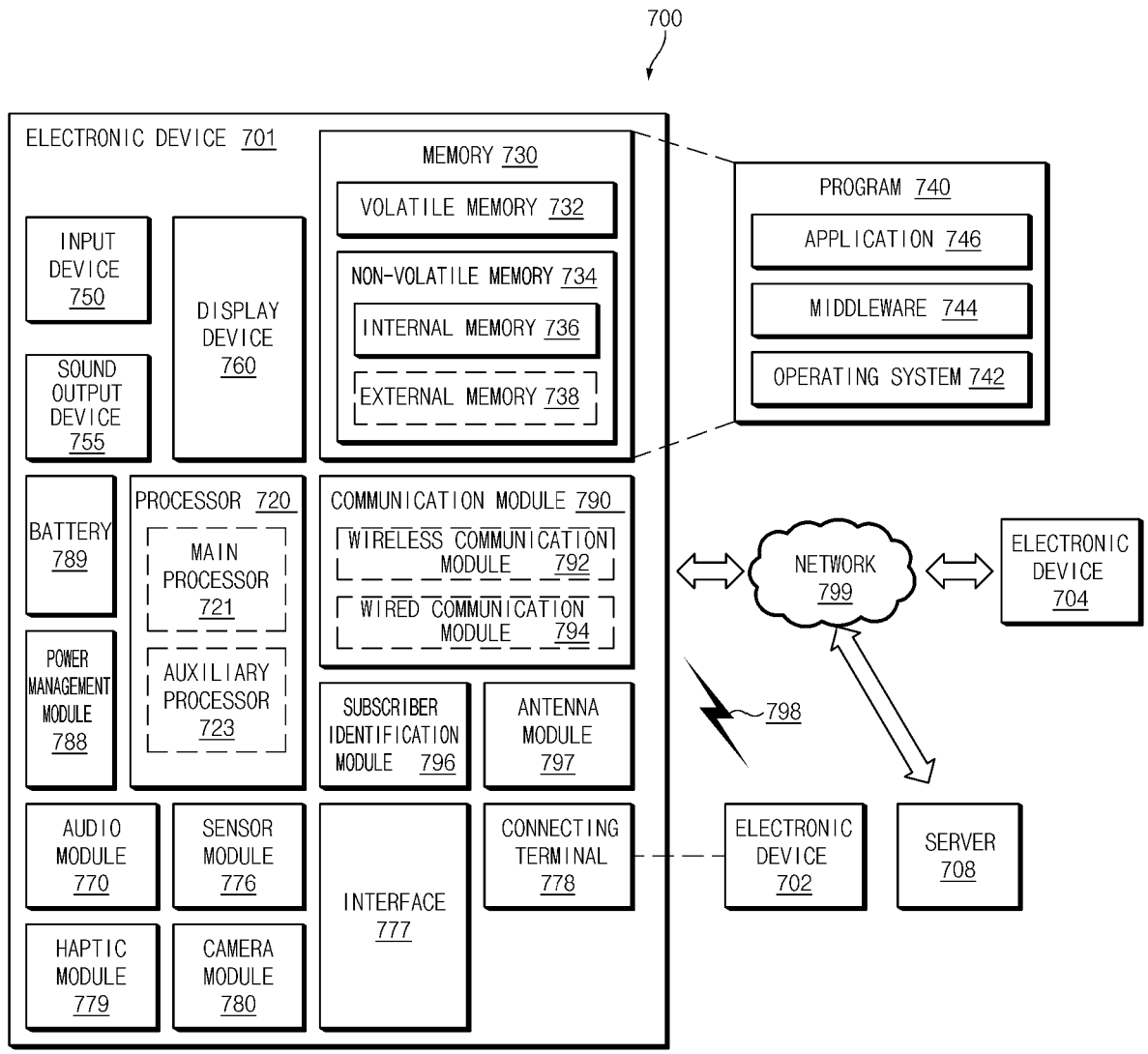
FIG. 7 is a block diagram of an electronic device in a network environment for recognizing a fingerprint using a display, according to various embodiments.

FIG. 7 is a block diagram of an electronic device in a network environment for recognizing a fingerprint, according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device

701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 8:
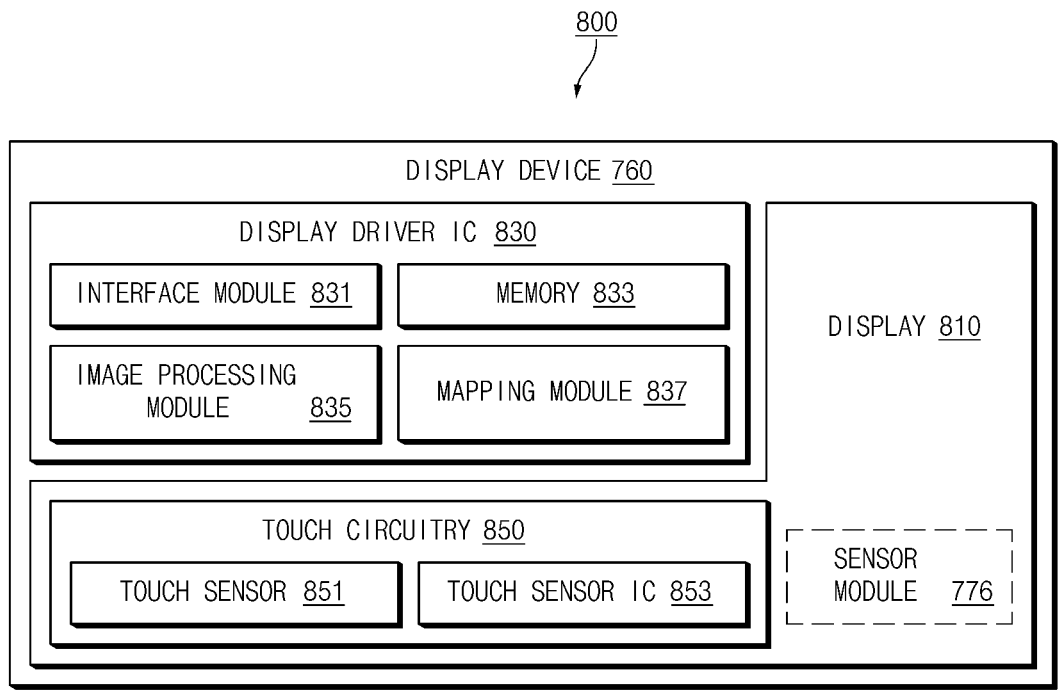
FIG. 8 is a block diagram of a display device for recognizing a fingerprint using a display, according to various embodiments.

FIG. 8 is a block diagram of a display device for recognizing a fingerprint, according to various embodiments.

FIG. 8 is a block diagram 800 illustrating the display device 760 according to various embodiments. Referring to FIG. 8, the display device 760 may include a display 810 and a display driver integrated circuit (DDI) 830 to control the display 810. The DDI 830 may include an interface module 831, memory 833 (e.g., buffer memory), an image processing module 835, or a mapping module 837. The DDI 830 may receive image information that contains image data or an image control signal corresponding to a command to control the image data from another component of the electronic device 701 via the interface module 831. For example, according to an embodiment, the image information may be received from the processor 720 (e.g., the main processor 721 (e.g., an application processor)) or the auxiliary processor 723 (e.g., a graphics processing unit) operated independently from the function of the main processor 721. The DDI 830 may communicate, for example, with touch circuitry 750 or the sensor module 776 via the interface module 831. The DDI 830 may also store at least part of the received image information in the memory 833, for example, on a frame by frame basis.

The image processing module 835 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 810.

The mapping module 837 may generate a voltage value or a current value corresponding to the image data pre-processed or post-processed by the image processing module 835. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 810 may be driven, for example, based at least in part on the voltage value or the current value such that visual information (e.g., a text, an image, or an icon) corresponding to the image data may be displayed via the display 810.

According to an embodiment, the display device 760 may further include the touch circuitry 850. The touch circuitry 850 may include a touch sensor 851 and a touch sensor IC 853 to control the touch sensor 851. The touch sensor IC 853 may control the touch sensor 851 to sense a touch input or a hovering input with respect to a certain position on the display 810. To achieve this, for example, the touch sensor 851 may detect (e.g., measure) a change in a signal (e.g., a voltage, a quantity of light, a resistance, or a quantity of one or more electric charges) corresponding to the certain position on the display 810. The touch circuitry 850 may provide input information (e.g., a position, an area, a pressure, or a time) indicative of the touch input or the hovering input detected via the touch sensor 851 to the processor 720. According to an embodiment, at least part (e.g., the touch sensor IC 853) of the touch circuitry 850 may be formed as part of the display 810 or the DDI 830, or as part of another component (e.g., the auxiliary processor 723) disposed outside the display device 760.

According to an embodiment, the display device 760 may further include at least one sensor (e.g., a fingerprint sensor, an iris sensor, a pressure sensor, or an illuminance sensor) of the sensor module 776 or a control circuit for the at least one sensor. In such a case, the at least one sensor or the control circuit for the at least one sensor may be embedded in one portion of a component (e.g., the display 810, the DDI 830, or the touch circuitry 750)) of the display device 760. For example, when the sensor module 776 embedded in the display device 760 includes a biometric sensor (e.g., a fingerprint sensor), the biometric sensor may obtain biometric information (e.g., a fingerprint image) corresponding to a touch input received via a portion of the display 810. As another example, when the sensor module 776 embedded in the display device 760 includes a pressure sensor, the pressure sensor may obtain pressure information corresponding to a touch input received via a partial or whole area of the display 810. According to an embodiment, the touch sensor 851 or the sensor module 776 may be disposed between pixels in a pixel layer of the display 810, or over or under the pixel layer.

The invention claimed is:

1. An electronic device comprising:
   a cover window;
   a display panel, including a plurality of pixels, disposed under the cover window;
   a fingerprint sensor disposed under a sensor portion of the display panel;
   a display driver integrated circuit (IC) electrically connected to the display panel; and
   a processor electrically connected to the fingerprint sensor and the display driver IC,
   wherein the processor is configured to:
   provide a first image to the display driver IC, the first image including a visual guide for requesting a contact for fingerprint-sensing at an area of the cover window corresponding to the sensor portion of the display panel,
   cause the display driver IC to output the first image through the display panel with a first brightness, and
   according to detecting a contact with respect to the visual guide, cause the display driver IC to:
     generate a second image by using the first image, and
     output the second image with a second brightness on an area excluding the sensor portion of the display panel and a third image on the sensor portion to emit, by pixels of the sensor portion, light for acquiring fingerprint information, wherein the second brightness is darker than the first brightness.

2. The electronic device of claim 1, wherein the processor allows the display driver IC to generate the second image by using a mask image and outputs the second image through the display panel at a first timing.

3. The electronic device of claim 2, wherein the processor generates the mask image, and wherein the display driver IC includes a memory configured to store the generated mask image and a controller configured to select the mask image stored in the memory and generate the second image.

4. The electronic device of claim 3, wherein the memory includes a graphic RAM (GRAM).

5. The electronic device of claim 1, wherein the processor allows the display driver IC to generate a mask image to include a hole corresponding to the sensor portion of the display panel.

6. The electronic device of claim 1, wherein the processor allows the display driver IC to output the third image having a specified shape in an area corresponding to the sensor portion of the display panel.

7. The electronic device of claim 6, wherein the processor allows the display driver IC to output the third image at a first timing.

8. The electronic device of claim 1, wherein the processor outputs the visual guide surrounding the sensor portion through the display panel when a condition for obtaining the fingerprint information through the fingerprint sensor is satisfied.

9. The electronic device of claim 8, wherein the processor allows the display driver IC to outputs the third image having a specified shape in an area corresponding to the sensor portion of the display panel.

10. The electronic device of claim 1, wherein when the second image is displayed, the display panel enters a high brightness mode, and wherein the second image causes the area excluding the sensor portion of the display panel to have the second brightness in the high brightness mode, and wherein the third image causes the pixels of the sensor portion to have a third brightness that is higher than the first brightness.

11. An electronic device comprising:
    a cover window;
    a display panel, including a plurality of pixels, disposed under the cover window;

a fingerprint sensor disposed under a sensor portion of the display panel;
a display driver integrated circuit (IC) electrically connected to the display panel; and
a processor electrically connected to the fingerprint sensor and the display driver IC,
wherein the processor is configured to:
provide a first image to the display driver IC, the first image including a visual guide for requesting a contact for fingerprint-sensing at an area of the cover window corresponding to the sensor portion of the display panel,
cause the display driver IC to output the first image through the display panel with a first brightness, and
when a contact with respect to the visual guide is detected, cause the display driver IC to generate a second image on the sensor portion of the display panel to emit, by predetermined pixels of the sensor portion, light for acquiring fingerprint information,
wherein the second image has a second brightness is brighter than the first brightness, and wherein the first image is displayed at a brightness darker than the first brightness.

\* \* \* \* \*